INVENTOR
Allen R. Philippe

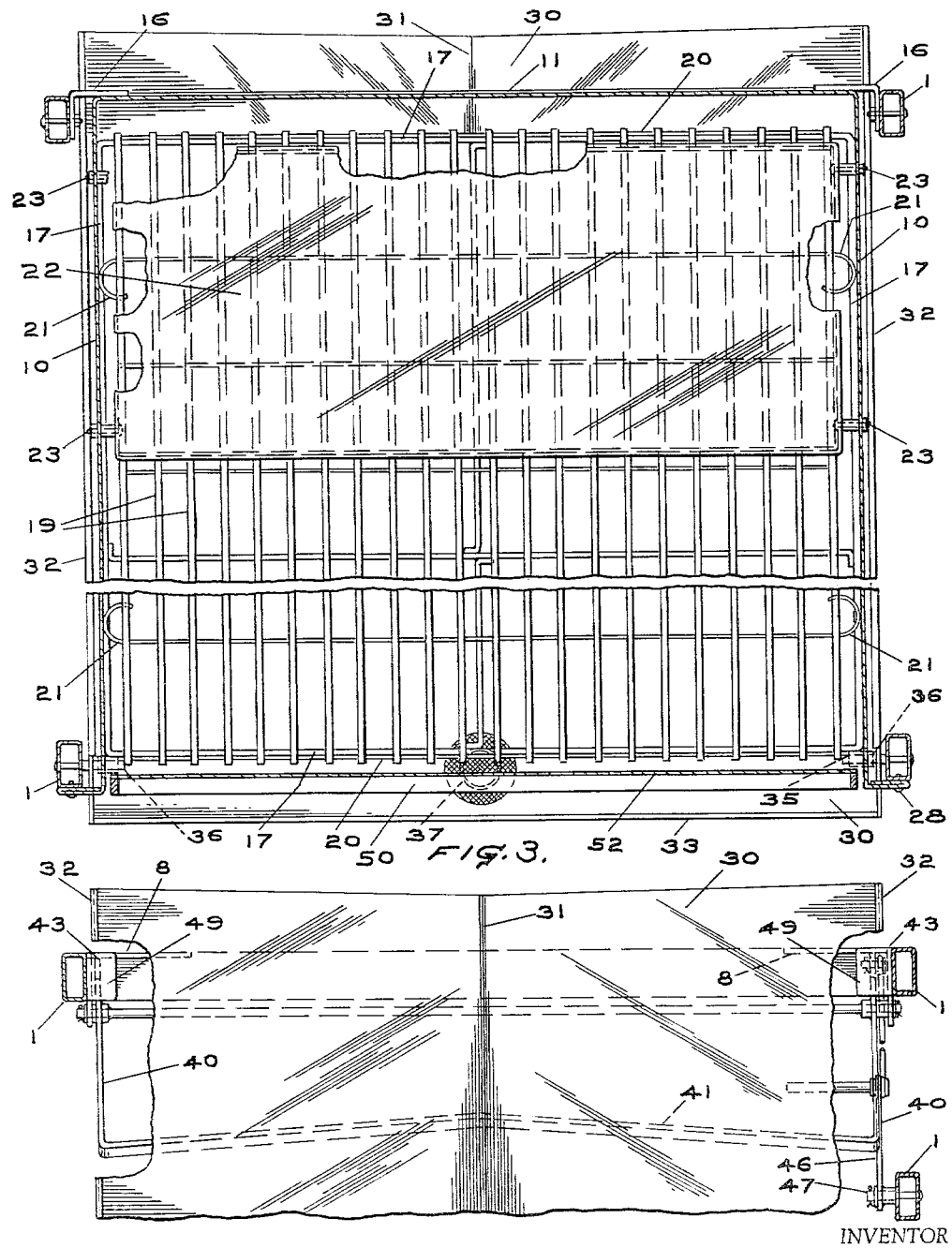

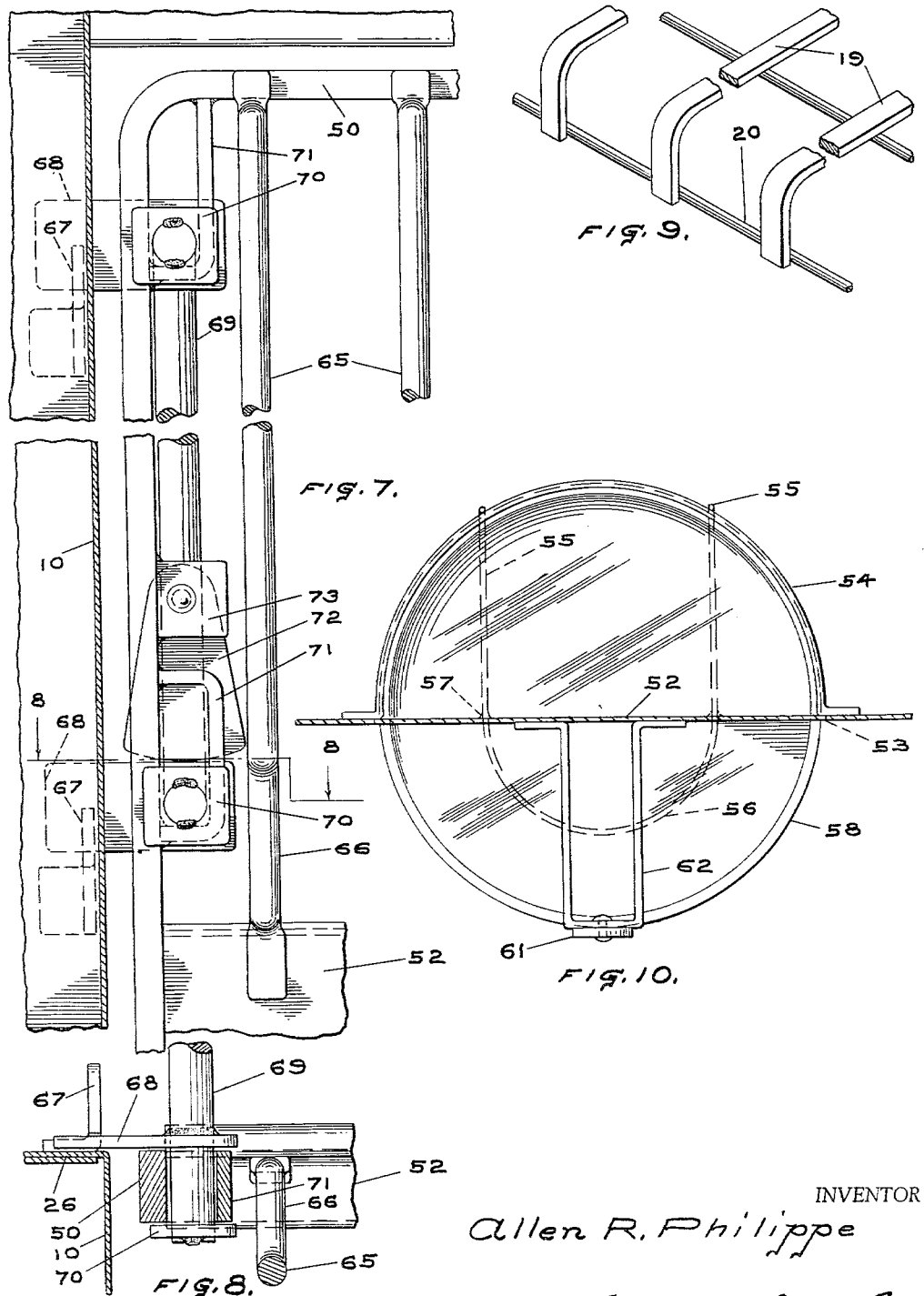

United States Patent Office 3,228,375
Patented Jan. 11, 1966

3,228,375
LABORATORY ANIMAL CAGE
Allen R. Philippe, Aberdeen, Md., assignor to Harford Metal Products, Inc., Aberdeen, Md., a corporation of Maryland
Filed Oct. 12, 1964, Ser. No. 403,184
5 Claims. (Cl. 119—17)

Larger laboratory animals such as dogs, cats, rabbits and the like are normally maintained in metal cages in which provision is made for the animal to rest on an open wire floor which permits urine and fecal matter to pass out of the living area and to be collected for disposal in a removable pan mounted beneath the floor. In large installations, the labor of emptying and cleaning the waste collection pan has been reduced by making provision to wash the pan out while it remains in place by flushing the material with a stream of water out through an opening at the rear of the pan into a waste connection trough mounted at the rear of the cage. This trough is mounted parallel to a row of cages, and conducts the waste material from the entire row to a common disposal point, usually a connection with the building waste system.

In the course of study with these animals, it is often necessary to collect the urine for analysis. The sample may be studied in a qualitative manner, and/or a quantitive manner, in which case, it is necessary to reduce losses due to evaporation or of urine simply failing to flow into the pan to a minimum. The most commonly used method for urine collection employs a pan shaped like a shallow four sided funnel with spout located near the front of the pan which flows the urine into a receiver jar normally located at the front of the cage. This pan cannot be flushed out, but must be manually removed and cleaned. Whenever it is in position, urine will be collected in the receiver and if the sample is not needed, an additional operation is required in disposing of the unwanted sample. The alternative is to substitute a second pan shaped for direct flushing action, entailing an exchange operation and additional cost for the extra pan.

This situation has been improved by the invention of Lee Ivey, Patent No. 3,098,465 which basically consists of a single pan which is suitable for both the flushing operation and the urine collection. Certain disadvantages are present in this set-up also. Some of these were apparent at the time of the invention and others became apparent as the units were placed in operation. Some of the design problems included:

(1) It is extremely difficult to observe the condition of the rearward placed receiver jars, particularly the one on the lower deck.

(2) The long projection of the receiver slide presents a safety hazard and is subject to damage when the cage is removed from the row for general machine washing. In the article as made, the slide ended at the back edge of the rack to eliminate this problem. This created new problems in that the urine outlet was no longer over the collection trough so that during flushing, water ran out to the cage below or to the floor. This was overcome by the addition of a swing baffle which was fairly effective in directing the water back into the trough, but definitely cluttered up the cage and added to the cost.

Operational problems included:

(1) Personnel forgot to withdraw the receiver jar before flushing, resulting in the jar being overflowed.

(2) The lip across the pan back which prevented flow of urine into the waste trough tended to throw the flushing water upward creating serious splashing outside the collection trough.

The cage now developed overcomes these disalvantages. The major departure from prior art consists of a tiltable waste pan or tray. This pan pivots at the cage front. In the "down" position shown, the pan can be flushed directly into a wall trough. In the "up" position, the pan slopes toward the cage front permitting urine to be collected at the cage front. The pan is tilted by a lever at the cage front connected to a bell crank arrangement at the rear which moves the pan up and down near its rear edge.

Several advantages of this system are apparent. In the "down" or non-collecting position, urine is drained into the rear trough instead of being collected. In the "up" position, urine is collected at the front of the cage where the receiver can be easily inspected. Cleaning in this position requires only that the operator drop the pan to the "down" position, flush, and return to the "up" position. The receiver does not have to be moved or removed, nor can it be filled with flush water. The basic pan or tray is a simple V shape which flows the urine into the center of the longitudinal axis. The tilt of the pan then flows the urine to the collection spout. This is considerably easier to fabricate in sheet metal than the previously used funnel shaped pans. Thus, a single pan serves for both flushing and metabolism work with the conversion being a simple and relatively fool-proof operation. In use, the operations on this unit are less in number and more convenient than those in Ivey's cage. In addition, the unit is less expensive to fabricate.

Several other design features are incorporated into this cage design. These include a perch tilted to the rear and with a gap between the rear wall to facilitate cleaning of the perch and to insure urine will flow from it. The perch is also spaced about one-half inch from each side wall to eliminate any crevices for filth or vermin to collect. A gap is also provided at the rear of the walk floor to permit large feces to be cleared from the floor. The pan sides are brought up outside and higher than the cage side walls, thus preventing any loss of urine through the gap between the cage and tilt pan or tray. The door rods are offset near their bottom. This prevents a dog from pawing the front ledge of the door and transferring feces from his feet to the ledge. Ventilating openings are punched in one side and the cage top and back. This area is then embossed to relieve the stretch caused by punching, thus reducing the tendency for the sheet metal to buckle.

Other objects and advantages of the invention will be apparent from the following description and the accompanying drawings forming a part hereof and in which:

FIGURE 3 is a horizontal sectional view on line 3—3 of FIGURE 2.

FIGURE 4 is a vertical fragmentary section showing the sliding support for the cage in the frame.

FIGURE 5 is a fragmentary horizontal sectional view of the corner of the tray and the adjacent frame structure showing the connection between the frame and the cage.

FIGURE 6 is a horizontal fragmentary view partly in section and partly broken away of the rear of the tray and the adjacent frame structure.

FIGURE 7 is a fragmentary vertical sectional view from the inside of the cage looking outwardly through one side of the front door of the cage, illustrating the locking mechanism for the cage door.

FIGURE 8 is a horizontal fragmentary sectional view on line 8—8 of FIGURE 7.

FIGURE 9 is a perspective view of one edge of the removable cage floor.

FIGURE 10 is a fragmentary horizontal view through the cage door showing the support for the water bowl.

In the drawings similar numerals refer to similar parts throughout the several views.

Figure 1:
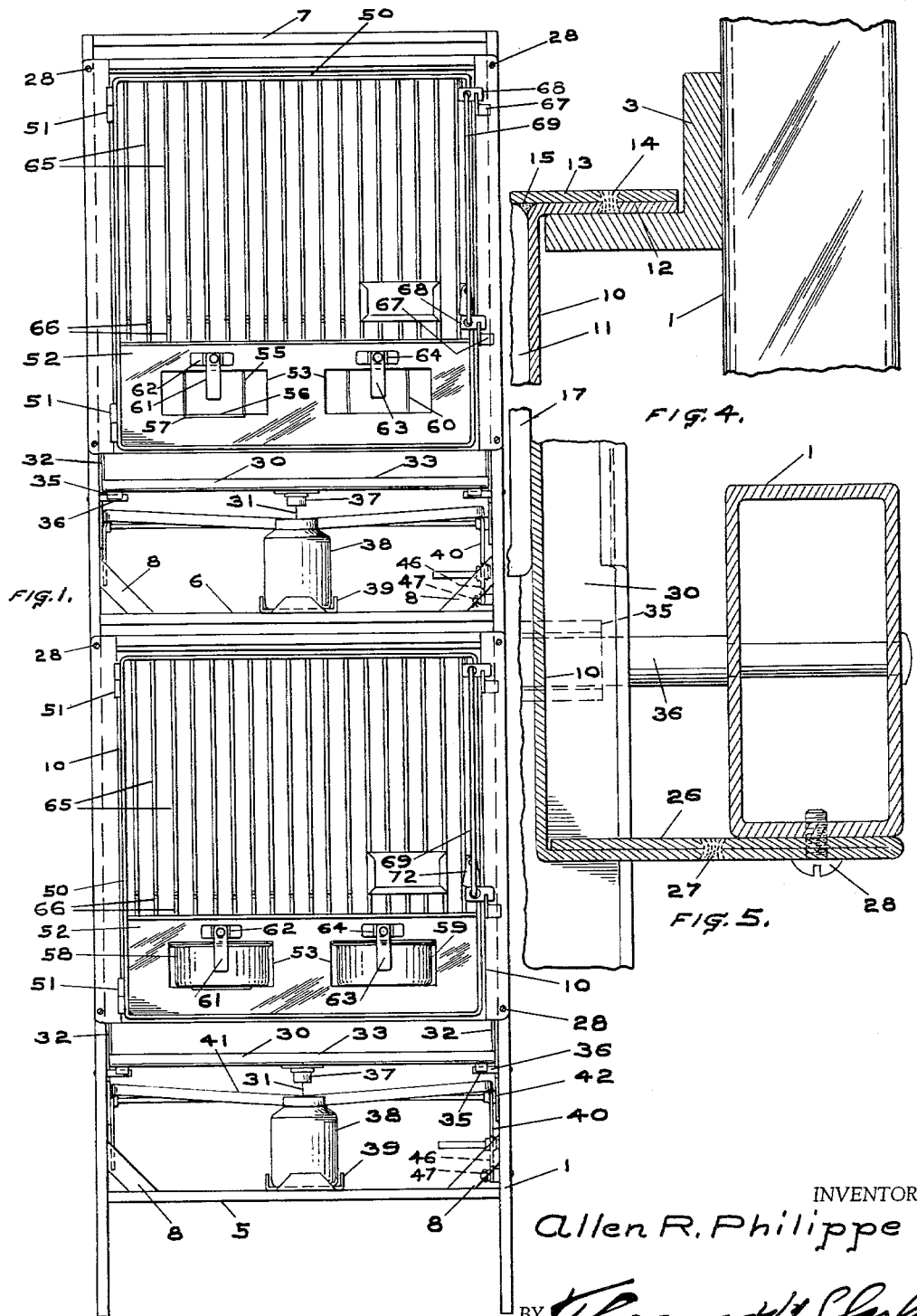
FIGURE 1 is a front elevational view of the frame structure with two cages inserted therein.

The frame structure in which the cages are mounted comprises tubular uprights 1 joined together from front to back by angles 2 at the bottom and 3 intermediately thereof and similar angles at the top. From side to side angles 4 and 5 at the lower end of the uprights connect them, then angles 6 connect them in the center and cross pieces 7 connect the uprights at the top. Gussets 8 brace the uprights angularly.

The cages individually have side and back walls 10 and 11 formed of a single piece of stainless steel. The top of the walls 10 have a projecting lip 12 and to this lip is welded a sheet top 13 which is welded at 14 and soldered at 15 to make a connection with the side walls which allows for no vermin to collect in crevices. Angles 3 on the uprights of the frame receive and support the projections 12 on the side walls thereon to support the cage between the uprights as shown in FIGURE 4. Angles 16 are welded to the rear wall 11 and bolted to the rear uprights 1 to fixedly attach the cage to the rear uprights 1 as shown in FIGURE 3.

Figure 2:
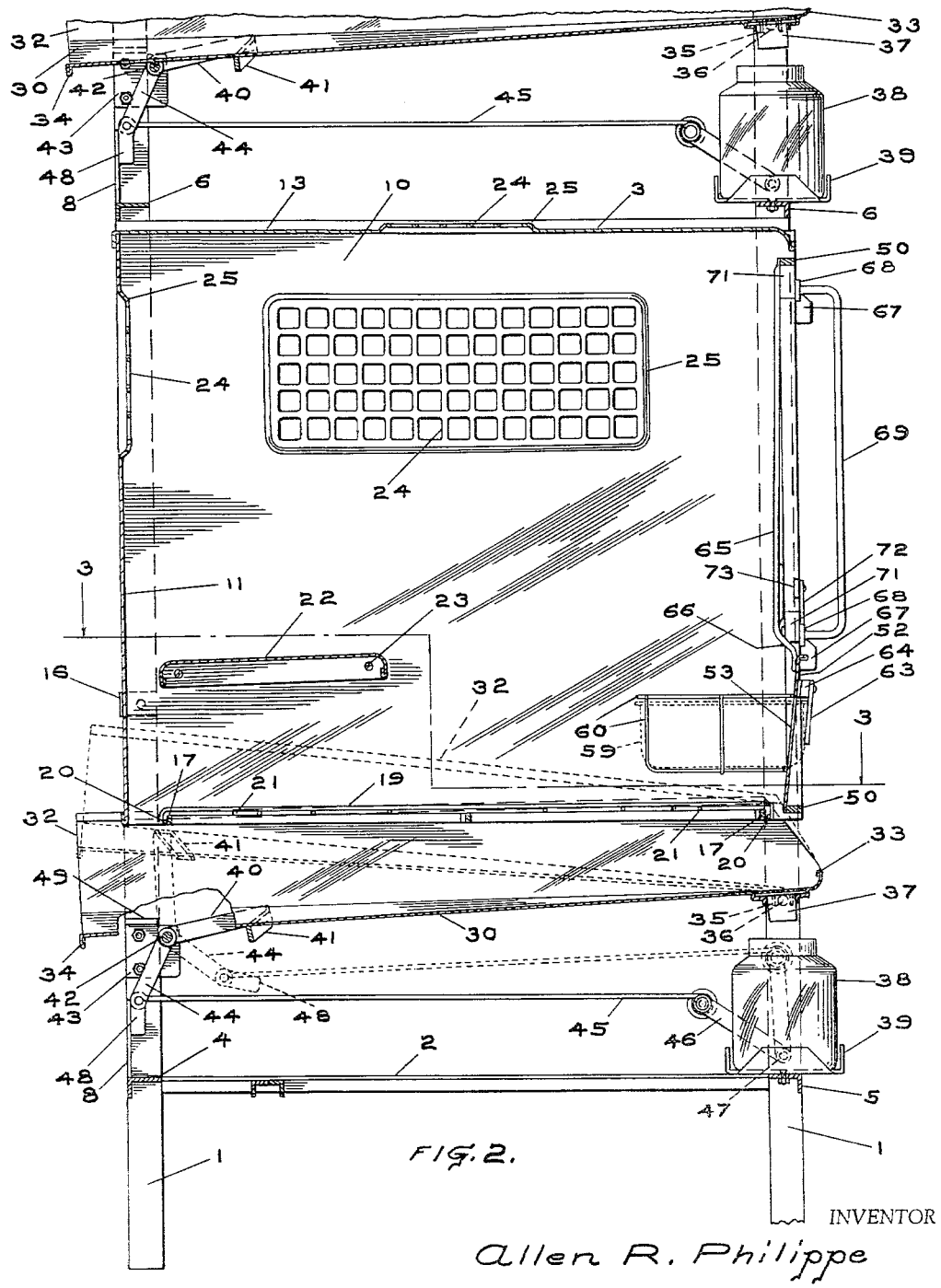
FIGURE 2 is a vertical sectional view thereof partly broken away but showing one cage in the frame.

A floor support structure 17 is welded to the side walls 10 of the cage, and is spaced from the rear of the cage as shown in FIGURES 2 and 3. The cage bottom consists of a plurality of flat or rectangularly sectioned bars 19 welded crosswise to rods 20 as shown in FIGURE 9. The bars 19 are bent downwardly at their ends as shown in this figure. The cage bottom is supported on the structure 17 and held firmly thereto by the downwardly extending ends of the bars 19 and by the crosswise extending bars 21 having semi-circular ends, the bars being welded to the bars 19 and extending beyond the sides of the floor as shown in FIGURE 3 and these curved ends of bars 21 slide on the structure 17 to give side support to the removable floor.

The perch 22 extends across the rear of the cage and is supported on the side walls by the bolts 23 as shown in FIGURE 3. This perch is spaced from both the side walls and the rear of the cage to allow for its cleaning and it slopes slightly downwardly toward the rear as shown in FIGURE 2.

One side wall and the rear of the cage as well as the top are punched out as shown at 24 and this area is then embossed to relieve the stretch caused by the punching as shown at 25. The side walls 10 at their vertical forward edges are bent upon themselves as shown at 26 and the two sections are then welded together as shown at 27. This doubled edge of the side walls is then attached to the uprights by screws 28, at the four corners of the front of the cage.

A pan or tray 30 having the lower surface thereof shaped like a V, the center of which is indicated at 31 extends under the whole cage as above described and it has upwardly extending sides 32 and upwardly directed forward lip 33 and a downwardly directed rear lip 34. It will be noted in FIGURE 2 that the depth of the V decreases toward the forward lip 33. This tray on each side of its front end, on its undersurface has welded thereto downwardly extending inverted U shaped members 35 the legs of which project to the front and rear of pins 36 mounted in the front uprights 1 of the frame structure. This inverted U shaped mounting 35 on the pins 36 allows for the tilting of the tray on the pins 36 and for the removal of the tray from the frame structure when desired. The forward end of the tray has downwardly directed screened funnel 37 therein which is spaced centrally from side to side of the tray. This funnel is immediately over removable jar 38 resting in support 39 bolted to cross-angles 5 and 6 on the front of the frame structure as shown in FIGURES 1 and 2.

A bell-crank lever having arms 40 connected by V shaped integral cross member 41 is pivoted on axis 42 in plates 43 projecting forward from the rear uprights 1 as shown in FIGURE 2. Cross-member 41 contacts the bottom of the tray as shown in this figure. The arms 40 are connected to the arms 44 one of which in turn is connected to the rod 45 which in turn is connected to the arm 46 pivoted at 47 to the front vertical upright of the frame structure as shown in FIGURE 2. The lowered position of the support member 41 of the bell-crank is limited by the adjacent gusset 8 limiting the movement of the extension 48 on arm 44. The upper position of the arms 40 is limited by the extensions 49 bent horizontally from the plates 43.

The door or front wall of the cage comprises a rectangular frame 50 hinged at 51 to the front of the side wall 10 as shown in FIGURE 1. The frame structure 50 has welded to the lower part thereof the plate 52 which slopes upwardly slightly outwardly as shown in FIGURE 2. This plate 52 has openings 53 therein for two wire bowl holding structures welded thereto. One of these structures has a semi-circular top 54 to which is welded the ends 55 of a wire loop 56. From these ends, the loop extends down, and is bent forward to its center, projecting without the plate 52. The loop is welded to the plate 52 as it passes through the opening 53 as shown at 57. This opening 53 receives a water bowl 58 half way through the opening, as shown in FIGURE 10. The other opening 53 receives a food bowl 59 passing all the way through the opening, the bowl being supported in the wire support 60, likewise welded to the plate 52.

In the case of both of these bowl holders, the top of the bowls are overlapped and held down by the semi-circular top 54 of FIGURE 10 and the full top of the holder shown in FIGURE 2, so that the animal can not upset either bowl.

A latch 61 on extended bracket 62, welded to plate 52 holds bowl 58 in place and a latch 63 on a shorter bracket 64, likewise welded to plate 52 holds bowl 59 in place.

Welded to the top bar of the door structure 50 and to the plate 52 are the substantially vertically extending bars 65 which are bent outwardly or forwardly on the cage door as shown at 66 to discourage the encaged animal from wiping its feet on the top edge of the plate 52 where the bottom ends of the bars are attached and thereby prevent an accumulation of feces on this edge.

Strikes 67 are welded to the outwardly turned angles of the side walls of the cage which receive therein latches 68 on and welded to handle 69 on the front of the door. This handle is held in the frame structure 50 of the door by plates 70 welded to its ends. The handle is held on the door frame by the aid of angles 71 welded to the door frame and by the plates 70 on one side and latches 68 on the other. A latch 72 is pivoted on plate 73 welded to the vertical side member of the door frame 50, as shown in FIGURES 7 and 8. The pivoted latch or keeper member 72 acts as a lock and prevents the unintentional opening of the door.

From the above description, it will be apparent that the urine samples may be collected in the jar when the tray is in its upward position and that the tray may be washed clean when in its lower position by flushing it and then the flushed material flows free of the cage and its supporting frames.

It will be apparent that various modifications and changes in the construction precisely shown may be made without departing from the invention defined in the following claims.

What is claimed as new and is desired to be secured by Letters Patent is:

1. In a cage for laboratory animals having top, side, front and rear walls and a bottom having spaced openings over substantially the whole area thereof, and a frame in which to mount said cage, a tray extending under the cage bottom and projecting outwardly beyond the rear and side walls thereof and means on the frame and tray adjacent the front of the tray on which to swing the tray vertically relative to the cage rear wall, lever means on the frame adjacent the rear of the cage having means thereon extending to the front of the cage to raise and lower the rear of the tray.

2. The cage and frame structure of claim 1 including a urine drain in the tray, adjacent the front thereof and collecting means on the frame, to receive urine from said urine drain.

3. The cage and tray structure of claim 1 including side walls on said tray projecting upwardly outside the cage.

4. The cage and frame structure of claim 1 in which the cage bottom is removable from the cage for cleaning and the cage has supports thereon to releasably support the cage bottom.

5. The cage and frame structure of claim 1 in which the cage front includes a peripherally extending door frame having therein vertically extending confining bars, the bars being positioned in the door frame to slope their lower ends outwardly, away from the cage interior.

References Cited by the Examiner
UNITED STATES PATENTS

| | | | |
|---|---|---|---|
| 2,700,369 | 1/1955 | Kasser | 119—22 |
| 2,701,547 | 2/1955 | Shaw | 119—22 |
| 3,032,010 | 5/1962 | Kaegebein | 119—21 |
| 3,087,458 | 4/1963 | Bennett | 119—17 |
| 3,098,465 | 7/1963 | Ivey | 119—15 |

SAMUEL KOREN, *Primary Examiner.*

ALDRICH F. MEDBERY, *Examiner.*